United States Patent [19]

Becker

[11] 4,208,282

[45] Jun. 17, 1980

[54] PROCESS FOR THE PURIFICATION OF SEWAGE WHILE RECAPTURING THE FATTY AND ALBUMINOUS MATTER IN REUSABLE FORM

[76] Inventor: Dieter J. Becker, 30, Hohenloher Ring, D 2081 Bönningstedt, Fed. Rep. of Germany

[21] Appl. No.: 952,951

[22] Filed: Oct. 20, 1978

[30] Foreign Application Priority Data

Mar. 1, 1978 [DE] Fed. Rep. of Germany ....... 2808703

[51] Int. Cl.² .............................................. C02C 1/40
[52] U.S. Cl. ......................................... 210/44; 210/45; 210/54; 210/64; 260/112 R; 260/121
[58] Field of Search ............. 260/112 R, 121; 210/10, 210/44, 13, 45, 51, 52, 53, 54 R, 54 A, 54 C, 64; 422/24

[56] References Cited

U.S. PATENT DOCUMENTS

| | | | |
|---|---|---|---|
| 3,000,790 | 9/1961 | Jeanes | 210/54 R |
| 3,082,173 | 3/1963 | Horvitz | 210/52 |
| 3,236,766 | 2/1966 | Levin | 210/44 |
| 3,248,225 | 4/1966 | Bode | 210/53 |
| 3,301,779 | 1/1967 | Kovacs | 210/53 |
| 3,314,880 | 4/1967 | Rubin | 210/44 |
| 3,467,647 | 9/1969 | Benninga | 210/54 R |
| 3,717,574 | 2/1973 | Werneke | 210/53 |
| 3,772,191 | 11/1973 | Thorn | 210/44 |
| 3,837,800 | 9/1974 | Wood | 422/24 |
| 3,962,079 | 6/1976 | Hunt | 210/54 C |

FOREIGN PATENT DOCUMENTS

| | | |
|---|---|---|
| 2400430 | 7/1975 | Fed. Rep. of Germany ............. 422/24 |
| 2530433 | 1/1976 | Fed. Rep. of Germany . |
| 2524172 | 12/1976 | Fed. Rep. of Germany . |
| 2647078 | 12/1977 | Fed. Rep. of Germany . |
| 49-40554 | of 1974 | Japan ......................................... 210/54 |
| 443844 | 4/1975 | U.S.S.R. ................................... 210/44 |

OTHER PUBLICATIONS

"Wasser, Luft, and Beitrieb" (Water, Air, and Operation) 20, pp. 500–501.
"Deutsche Milchwirtschaft" (German Dairy Economy) 26, p. 879 ff (1977).
"Phosphate Gives Starch New Properties", C & En., Jun. 27, 1960, p. 84.
"Dissolved Air Flotation of Poultry Processing Waste", Reed, J. WPCF, vol. 48, No. 1, Jan. 1976, p. 107.

*Primary Examiner*—Ernest G. Therkorn
*Attorney, Agent, or Firm*—Roylance, Abrams, Berdo & Farley

[57] ABSTRACT

There is disclosed a process for the purification of sewage containing fatty and albuminous matter. Raw sewage, which is optionally subjected to primary settling in a primary settling tank, is adjusted so that the pH is approximately the same as the isoelectric point of the main components of the proteins present in the sewage. The sewage is then mixed with an aqueous solution of a substituted anionic starch to precipitate the fatty and albuminous matter by flocculation. Following a short dwell time period, the sewage is subjected to an expansion flotation under a dispersion pressure of 4.5–6 bar. The flotation sludge is separated and a clarified effluent is obtained. The flotation sludge is sterilized by treatment with ultraviolet radiation and the clarified effluent is passed to waste.

10 Claims, No Drawings

PROCESS FOR THE PURIFICATION OF SEWAGE WHILE RECAPTURING THE FATTY AND ALBUMINOUS MATTER IN REUSABLE FORM

The invention relates to a process for the purification of sewage containing fatty and albuminous matter, especially of dairy wastes or sewage from meat and poultry processing plants, etc. Preferably, the sewage is free of fecal sewage. The fatty and albuminous matter are recaptured in a form which makes possible its re-use, for example, as a feed product.

The known processes for the purification of sewage where, after a mechanical pre-treatment, a biological and/or chemical purification of the sewage is carried out, do lead to sewage purified to the point so that it may be removed unhesitatingly by way of receiving waters. However, either an anaerobic decomposition in sludge digesting installations is provided for the volume of sludge, consisting mostly of organic components, which is obtained; or else a sludge incineration plant is used. However, these processes do not make possible a recapture of the fatty and albuminous matter, contained in the sewage, in a form, which would permit a direct re-use.

It has also been known to mix the mechanically pre-cleaned sewage with flocculation agents, for example, with lime and aluminum sulfate or with additives of different polyelectrolytes on the basis of high polymer compounds such as polyacrylamide, polyamines and polyethyleneimine, in order to remove the colloidally dissolved components by precipitaion from the sewage, see for example, German OS No. 26 47 078, German OS No. 25 30 493 and German OS No. 25 24 172. These agents however, are either not suitable for precipitating the fatty and albuminous matter, or the precipitation products obtained are not re-usable directly as animal feed, because of the incompatibility or impalatability of the precipitants. Thus, they still have to be freed first, Generally in costly and time-consuming processes, of the precipitants. This makes these processes economically uninteresting.

Other known processes make use of diaphragm filtration or flotation. The diaphragm filtration will avoid the known disadvantages but it is very expensive and therefore it may only be used in a limited way in special cases. It is in no way suitable for a profitable use on a larger industrial scale. The floatation processes which have become known hitherto operate with similar flocculation agents, as used in chemical precipitation, and therefore have the same above-mentioned disadvantages.

In "Deutsche Milchwirtschaft" (German Dairy Economy), 26, p. 879 ff (1977), the clarification of diary wastes is described on the basis of the model case. The process makes use of a combination of customary clarification steps, with mixing and compensating tanks, bio filters, rotary screens, aeration tanks and secondary settling basins, etc. Although satisfactory results are achieved relative to the purification of the sewage, no means is provided for the separation and processing of the fatty and albuminous matter.

"Wasser, Luft and Betrieb" (Water, Air and Operation), 20, pp. 500–501 (1976), describes a process for the recovery of albumin from sewage. In this process, protein and fat is to be recovered in a form suitable for feeding animals. The process consists of a combination of unit operations, such as flotation, sedimentation and ion exchange. Flotation is used for the separation of free and emulsified fat as well as of suspended matter. Fatty emulsions are destroyed by the addition of sulfuric acid to attain a pH value between 3 and 5. After elimination of the fatty sludge obtained and of the albuminous suspended matter by flotation, one may flocculate additional protein, by the addition of CaO up to a previously determined pH value, together with 1–2 ppm of a polyacrylic amide - polyelectrolyte. The separation of the flocculated protein also takes place either by flotation or by sedimentation. The residue quantities of albuminous matter together with pigments from the sewage are removed by treatement with a highly porous ion exchange resin with an alkaline salt solution, the protein is rinsed out. It may also be precipitated and, after neutralization and heating of the solution to 90° C., as degenerated albumin product, may be dehydrated and dried. This known process will permit recovery of directly usable fatty and albuminous matter from certain sewage. For this, however, at least three processing steps are needed. Since one will apparently not succeed in a quantitative precipitation of the fatty and albuminous matter in one step, the sewage, after flotation and flocculation must be subjected in a further step to a quite expensive treatment with ion exchange resins, especially developed therefore. As a result, the process becomes time consuming and expensive and is considered for large scale industrial operation only in special exceptional cases.

It is an object of this invention to provide a process in which fatty and albuminous matter may be separated practically and quantitatively from the sewage in a more simple and economically advantageous manner, and may be recovered in a directly re-usable form.

In accordance with this invention, there is provided a process for the purification of sewage, containing fatty and albuminous matter, especially of dairy wastes or wastes from meat or poultry processing plants or similar plants, in which the fatty and albuminous matter is precipitated out by means of flocculation agents and subsequent expansion flotation. Optionally, mechanically prepurified sewage is adjusted to a pH value which lies near the average isoelectric point of the main protein mixture present, it is mixed subsequently with an aqueous solution of a substituted anionic starch while stirring continuously, and is then, after a short dwell time, subjected to an expansion flotation under a dispersion pressure of 4.5 to 6 bar. The flotation sludge thus obtained is separated from the clarified sewage, is drawn off and is sterilized by a single or repeated passages through a UV sterilizing installation. The clarified sewage is diverted, optionally by way of a series connected biological clarification stage, into the receiving water.

The process of this invention is distinguished by an advantageous combination of different processing steps, which make it possible to free sewage practically quantitatively of fatty and albuminous matter in a time and expense-saving manner, whereby these substances are obtained largely in a form in which their natural quality is preserved. They are not contaminated by unpalatable or even harmful additives, and may therefore be fed directly, i.e., without additional processing, to re-use, for example, as valuable fatty or albuminous feed.

The process of this invention may be used with all sewage which contains fat and albumin. The process operates economically and is particularly advantageous in the case of sewage with a relatively high content of fatty and albuminous matter. Therefore, the process is suitable for the purification of dairy wastes as well as sewage from meat and poultry processing plants. In order not to impede the sterilization of fatty and albuminous sewage obtained, the wastes should be as free as possible of feces whenever the protein substances obtained are to be used as animal feed.

In cases where the sewage to be purified is very heavily charged, for example, by solid components and/or by large quantities of fat, a preliminary purification is desirable. In any case, the sewage is adjusted to a certain pH value, which comes as close as possible to the isoelectric point of the main component or to the average isoelectric point of several main components.

The best pH value depends on the pertinent quality of the sewage that is to be purified and especially on the composition of the albuminous substances and may be determined in simple preliminary experiments which are familiar to any expert. By the adjustment of the isoelectric point, a natural coagulation and formation of flocks connected with it, will be achieved. This is completed by the addition of an aqueous solution of a substituted anionic starch as a flocculating agent. Even materials, the isoelectric points of which do not lie within the adjusted pH range, flocculate out.

Generally, the adjustment of the pH value in the range between 3.5 and 5.0 has proven to be particularly advantageous. Preferably, the pH adjustment is accomplished by the addition of a 15% sulfuric acid, since the type of sewage which comes mainly into question mostly has a higher pH value.

Another advantage of the process of the invention consists in the fact that the flocculating agents provided are not only very effective, but that they also represent no foreign substances in the sense of the law governing feed products, so that when the fatty and albuminous substances which were precipitated out are to be used again as animal feed, they need not be separated in an additional purification process. This contributes considerably to the profitability and advantages of the present process.

As a flocculation agent, one uses according to this invention an aqueous solution of subtituted anionic starch. The starch derivatives must be water soluble and the degree of substitution used is determined by this condition. Preferably, an acetylated starch with a degree of substitution between about 0.15 and 1.8, and more preferably between 0.18 and 0.35 related to 100 anhydro-glucose units, is used. The use of acetylated potato starch with a degree of substitution in the above mentioned range has proven to be particularly favorable, both in regard to its effectiveness as a flocculating agent as well as in regard to costs. A very effective flocculating agent was found, furthermore, to be a phosphatized starch with a degree of substitution between about 0.05 and 0.5 related to 100 anhydroglucose units, especially in a potato starch - phosphate complex. Moreover, good results were achieved with a potato starch - maleinate - semiacetal complex with a degree of substitution of 0.01 to 0.06, related to 100 anhydroglucose units.

In all cases mentioned, the concentration of the aqueous starch solutions lie preferably in the range between 0.1 and 2.0% by weight, and more preferably between 0.1 and 1.0% by weight. With such concentrations, the visocity lies in a favorable range, and the required volume of water is still in an order of magnitude which can be handled without too great expenditure.

The anionic starch derivatives mentioned are known per se and are partly obtainable commercially. They may be produced according to known processes, which for example, are described in R. L. Whistler and J. N. BeMiller (publisher), "Industrial Gums", 2d ed., 1965, pp. 727 ff or in "Methods in Carbohydrate Chemistry", published by R. L. Whistler et al, vol. IV (Starch), 1st ed., 1964, especially pp. 294 ff, the disclosures of which are incorporated herein by reference.

After a short dwell time, the actual separation of the fatty and albuminous matter from the sewage takes place in an expansion flotation installation of known construction and method of operation, during which the dispersion pressure is adjusted to between 3.5 and 5.0 bar. The flotation sludge obtained may be separated as a rule without difficulties from the clarified sewage and after sterilization in a UV-sterilization plant, it represents a high grade fat and especially protein containing animal feed. The degree of separation in the flotation stage of the substances suspended in the sewage and dissolved colloidally amounts as a rule to more than 90%.

The investment and operating costs of the process of the invention are clearly lower than in the processes used hitherto. The high purification performance, which may be achieved with the present process and the possibility of recovering valuable fat and protein substances from the sewage without interference by dissolved secondary products, such as detergents, salts, etc, is of essential advantage. Preferably, the drawn-off flotation sludge is sterilized by 20–50 passages through a UV sterilization installation with at least 7 UV radiators. The flotation sludge obtained according to the process of the invention may be fed to direct further processing. Preferably it is used as a protein animal feed, for example, in fattening pigs.

The invention will be explained further in the following pages on the basis of examples, without being limited by the examples.

EXAMPLE 1

A stream of dairy wastes of 1.5 $m^3$ h was first delivered with a level-controlled pump into a closed holding tank. The temperature of the sewage fluctuated between 10° and 25° C., the mean being about 18° C. The pH value likewise fluctuated fairly widely within the range between 8 and 13.5.

From the holding tank a continuous stream of sewage was taken and fed to receivers in which the sewage was adjusted to a pH value of about 3.5, which had been determined in a preliminary experiment to be favorable, by the addition of 15% sulfuric acid by means of a dosing pump, which was controlled by way of a pH metering control apparatus, while stirring constantly. The adjusted sewage reached the preflocculation zone via a siphon-like spillway, where a 1% aqueous solution of an acetylated potato starch with a degree of substitution of 0.24, related to 100 anhydroglucose units, was dosed into the sewage by way of a dosing pump while stirring constantly, at a quantity, which corresponds to 50 g. of acetylated starch/$m^3$ of sewage. The dwell times during the pH adjustment and preliminary flocculation amounted to 20 minutes for each operation.

The pre-treated sewage was pumped from the preliminary flocculation zone, at a through-put volume of 1.5 $m^3$/h to the expansion flotation installation, which had a flotation surface of 0.384 $m^2$ and a flotation volume of 0.265 $m^3$. The expansion flotation was carried out at a dispersion pressure of 4.2 bar. Part of the clear water discharge was used for the conditioning of the dispersion.

The flotation sludge obtained was drawn off, was collected in a tank and was effectively sterilized by 30 passages through a sterilizing installation with 7 UV radiators with a rated output of 540 VA and a capacity of 3 m$^3$/h.

The clear water effluent flowing out of the flotation installation, was neutralized in a further step with a base, for example, with diluted caustic soda solution, and was freed in a series connected activated sludge installation of dissolved substances contained in it, such as detergents, sugar, salt, etc.

The raw sewage from production had an average value of 1246 mg.O$_2$/l for 35 experimental days for its chemical oxygen requirement (CSB). The individual values for CSB fluctuated between 481 mg O$_2$/l and 2,871 mg O$_2$/l. The average CSB value for the clear water running off from the flotation installation, was 453 mg O$_2$/l with a range of fluctuation between 124 mg O$_2$/l to 1760 mg O$_2$/l. An average reduction of the CSB value of 63.8% was obtained.

The lowering of the protein and fat content from untreated water to clear water amounted to about 96.7%.

After recirculating 30 times across the 7 radiator UV sterilizing installation, which had a length of 1 m, the coliform germs were reduced from 25/100 ml to zero/100 ml. The total germ count dropped simultaneously from an average 360 to 26.

Sterilized samples of flotation sludge, which had been stored more than 6 months at 4° C., as compared to samples which were measured 24 hours after radiation, showed no change in the germ count.

For the protein sludge, the animal feed analysis related to the dry substance, resulted in the following compositions:
crude ashes: 4.5% by weight
albumin: 59.9% by weight
total fat: 11.2% by weight
starch: 17.6% by weight
raw fibers: 0.5% by weight
total sugar: not detectable In a fattening experiment with protein sludge, it turned out that it, as a protein aminal feed, may fully replace soybean meal.

EXAMPLE 2

The experiment described in Example 1 was repeated except that instead of the acetylated potato starch, an 0.5% aqueous solution of an anionic potato starch - phosphate - complex with a degree of substitution of 0.1, related to 100 anhydro-glucose units was used as the flocculating agent. After the flotation step an average reduction of the CSB values of 53.4% was achieved.

The lowering of the protein and fat content, from untreated water to clear water amounted to about 76.4%.

EXAMPLE 3

The experiment described in Example 1 was repeated, except that instead of the acetylated potato starch, an 0.1% aqueous solution of a potato starch -maleinate - semiacetal complex, with a degree of substitution of about 0.02, related to 100 anhydro-glucose units, was used as the flocculating agent. After the expansion flotation, an average reduction of the CBS values in clear water of 62.1% was measured. The lowering of the protein and fat content from untreated water to clear water amounted to about 92.4%.

I claim:

1. A process for the purification of sewage containing fatty and albuminous matter which comprises adjusting the pH value of the sewage to approximately the isoelectric point of the main components of the proteins present in the sewage; mixing said sewage with an aqueous solution of a substituted anionic starch to precipitate the fatty and albuminous matter by flocculation; following a short dwell time, subjecting said sewage and flocculated material to an expansion flotation under a dispersion pressure of 4.5–6 bar; separating the flotation sludge thus obtained from clarified effluent; sterilizing said flotation sludge by treatment with ultraviolet radiation; and passing the clarified effluent to waste.

2. A process as defined in claim 1 wherein said sewage is first subjected to conventional screening and grit removing treatments to yield a primary settled sewage which is adjusted to a pH in the range of 3.5 to 5.0.

3. A process as defined in claim 1 wherein said pH adjustment is accomplished by the addition of 15% sulfuric acid.

4. A process as defined in claim 1 wherein said substituted anionic starch is an acetylated starch with a degree of substitution between about 0.15 and 1.8, related to anhydro-glucose units.

5. A process as defined in claim 4 wherein said acetylated starch is potato starch.

6. A process as defined in claim 1 wherein said anionic starch is a phosphated starch with a degree of substitution between about 0.05 and 0.5, related to 100 anhydroglucose units.

7. A process as defined in claim 6 wherein said phosphated starch is a potato starch - phosphate complex.

8. A process as defined in claim 1 wherein said starch is a phosphate starch - maleinate - semiacetal complex with a degree of substitution of 0.01 to 0.06, related to 100 anhydro-glucose units.

9. A process as defined in claim 1 wherein the concentration of the aqueous starch solution is in the range of 0.1 to 2.0% by weight.

10. A process as defined in claim 1 wherein the flotation sludge is sterilized by passing it 20 to 50 times through an ultraviolet sterilizing apparatus which contains at least seven ultraviolet radiators.

* * * * *